(12) United States Patent
Ishiguro et al.

(10) Patent No.: US 8,763,659 B2
(45) Date of Patent: Jul. 1, 2014

(54) PNEUMATIC TIRE WITH TREAD HAVING SUB-GROOVES AND SIPES

(75) Inventors: Kazuya Ishiguro, Hiratsuka (JP); Yoshifumi Koishikawa, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 1129 days.

(21) Appl. No.: 12/693,606

(22) Filed: Jan. 26, 2010

(65) Prior Publication Data

US 2010/0186861 A1 Jul. 29, 2010

(30) Foreign Application Priority Data

Jan. 26, 2009 (JP) ................. 2009-014517

(51) Int. Cl.
*B60C 11/12* (2006.01)

(52) U.S. Cl.
USPC ............ 152/209.22; 152/209.27; 152/DIG. 3

(58) Field of Classification Search
USPC ........................ 152/209.22, 209.27, DIG. 3
See application file for complete search history.

(56) References Cited

U.S. PATENT DOCUMENTS

| | | | | |
|---|---|---|---|---|
| 4,545,415 A * | 10/1985 | Lindner et al. | ............ | 152/209.1 |
| 6,439,285 B1 * | 8/2002 | Elkurd et al. | ............ | 152/209.3 |
| 2003/0226629 A1 * | 12/2003 | Kimishima | ............ | 152/209.18 |
| 2009/0229721 A1 * | 9/2009 | Ikeda | ............ | 152/209.18 |

FOREIGN PATENT DOCUMENTS

| | | | | |
|---|---|---|---|---|
| JP | 62-004608 A | * | 1/1987 |
| JP | 06-183214 A | * | 7/1994 |
| JP | 08-072510 A | * | 3/1996 |
| JP | 10-166813 A | * | 6/1998 |
| JP | 2007-230251 A | | 9/2007 |

OTHER PUBLICATIONS

Machine translation for Japan 08-072510 (no date).*
Machine translation for Japan 06-183214 (no date).*
Abstract for Japan 62-004608 (no date).*
Machine translation for Japan 10-166813 (no date).*

* cited by examiner

*Primary Examiner* — Steven D Maki
(74) *Attorney, Agent, or Firm* — Thorpe North & Western LLP

(57) ABSTRACT

Five land portions on tread surface are demarcated by four main grooves that extend in a tire circumferential direction TC. The five land portions include a center land portion between the first main grooves, two middle land portions between the first main grooves and the second main grooves, and two shoulder land portions located toward the outside of the second main grooves in the tire width direction, and sub-grooves and sipes are formed on the land portions. The total groove surface area ratios of the sub-grooves and the sipes in the land portions are different in the center land portion and the shoulder land portion as compared to the middle land portion, with the total groove surface area ratio being lower in the center land portion and the shoulder land portion and being higher in the middle land portion.

21 Claims, 5 Drawing Sheets

PNEUMATIC TIRE WITH TREAD HAVING SUB-GROOVES AND SIPES

PRIORITY CLAIM

Priority is claimed to Japan Patent Application Serial No. JP2009-014517 filed on Jan. 26, 2009, which is incorporated herein by reference in its entirety.

TECHNICAL FIELD

The present invention relates to an all-season pneumatic tire with sipes provided on a tread surface, and particularly relates to a pneumatic tire that has enhanced dry performance while maintaining snow performance.

BACKGROUND ART

Conventionally, in addition to main grooves that extend in a circumferential direction of a tire and sub-grooves that extend in a width direction of the tire, all-season pneumatic tires that are used throughout the year also have sipes on a tread surface in order to demonstrate favorable snow performance. An example of this type of pneumatic tire is the commonly known tire shown in FIG. 8.

This pneumatic tire has four main grooves 42 that extend in the circumferential direction of the tire formed in a tread surface 41. Additionally, five land portions 43 are formed by these four main grooves 42. Each of the land portions 43 has sub-grooves 44 and sipes 45 that extend in the width direction of the tire, and the center land portion 43A located between the inside main grooves 42 is formed into ribs 43A1 and blocks 43A2. Center land portion 43B located between inside main grooves 42 and outside main grooves 42, and shoulder land portions 43C located to an outer side in the tire width direction of the outside main groove 42 are respectively formed into blocks (refer to Japanese Patent Publication (A) No. 2007-230251).

Incidentally, in recent years there has been demand for increased safety with respect to pneumatic tires in conjunction with higher vehicle performance. The aforementioned all-season pneumatic tires are no exception, and additional improvements are desired.

DISCLOSURE OF THE INVENTION

An objective of the present invention is to provide a pneumatic tire that can improve dry performance while maintaining snow performance at current levels.

SUMMARY OF THE INVENTION

The pneumatic tire of the present invention that achieves the aforementioned objectives has one first main groove that extends in the circumferential direction of the tire on each side of a tire equatorial plane on the tread surface; one second main groove that extends in the tire circumferential direction formed on the outward side of each first main groove; and five land portions that are formed into divisions by the four main grooves. The five land portions consist of a center land portion between the first main grooves, two middle land portions located between the first main grooves and the second main grooves, and two shoulder land portions located to the outward side of the second main grooves in the tire width direction. Furthermore, sub-grooves and sipes are formed in each of the land portions. A combined groove surface area ratio of the sub-grooves and the sipes in each of the land portions is different in the center land portion and the shoulder land portions as compared to the middle land portions, with the groove surface area ratio of the center land portions and the shoulder land portions being lower and the groove surface area ratio of the middle land portions being higher.

EFFECT OF THE INVENTION

With the aforementioned present invention, on dry road surfaces, the center land portion that affects steering stability when driving straight and the shoulder land portion that affects steering stability during cornering have low groove surface area ratios, and the rigidity of the center land portion and the shoulder land portion is increased, so the steering stability on dry road surfaces can be increased, and dry performance can be improved.

On the other hand, the grooves surface area ratio is increased in the middle land portions that affect snow performance, and therefore a loss of snow performance can be suppressed and the same conventional level of snow performance can be maintained even though the groove surface area ratio is reduced in the center land portion and the shoulder land portion.

BEST MODE FOR CARRYING OUT THE INVENTION

Embodiments of the present invention are described below in detail while referring to the attached drawings.

Figure 1:
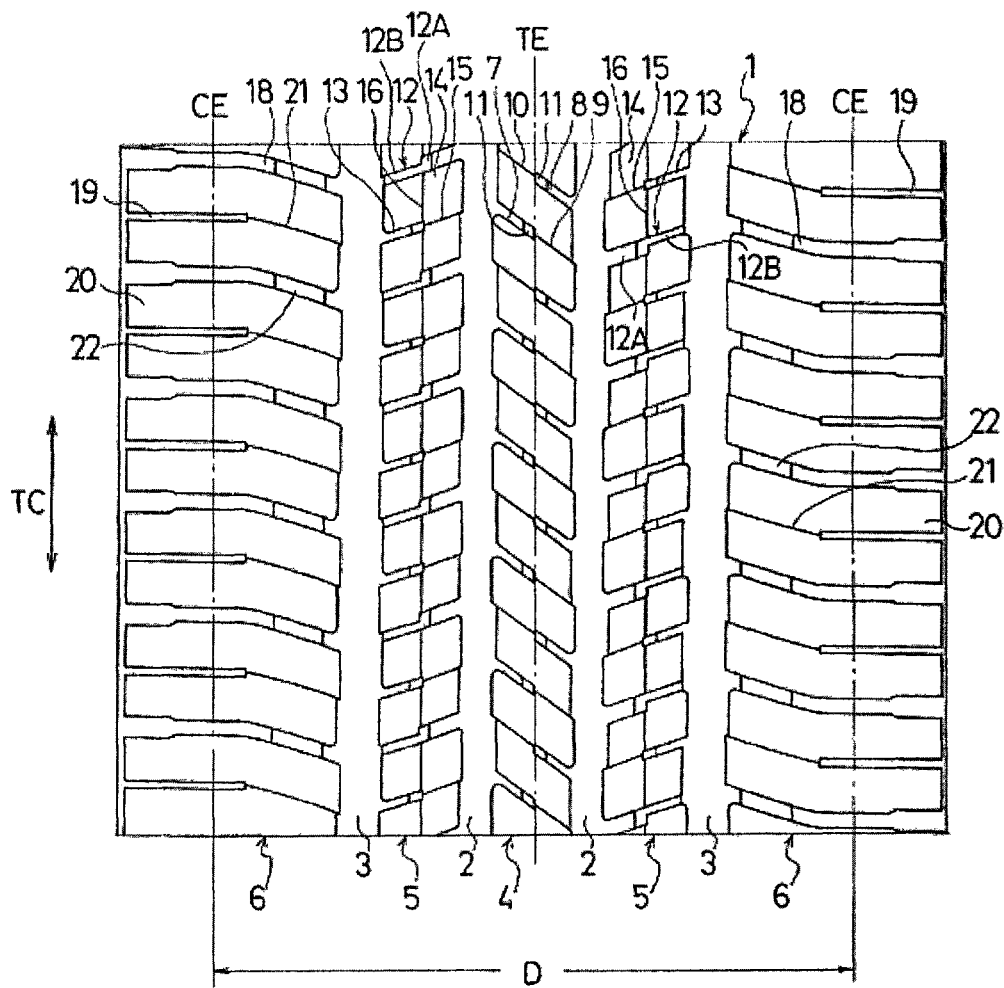
FIG. 1 is a development view of the tread surface part for an embodiment of the pneumatic tire of the present invention.

FIG. 1 illustrates an embodiment of a pneumatic tire of the present invention, where 1 represents a tread surface, TE represents a tire equatorial plane, and TC represents a tire circumferential direction.

The tread surface 1 has four main grooves that extend as a ring in the tire circumferential direction TC. The four main grooves include one first main groove 2 on each side of the tire equatorial plane TE, and one second main groove 3 to the outside of both first main grooves 2. Note, the main grooves 2, 3 herein are grooves in the circumferential direction having a width between 3 and 20 mm and a depth between 5 and 13 mm.

Five land portions are demarcated on the tread surface 1 by these four main grooves 2, 3. The five land portions include a center land portion 4 between the first main grooves 2, two middle land portions 5 between the first main grooves 2 and the second main grooves 3, and two shoulder land portions 6 located to the outside of the second main grooves 3 in the tire width direction.

A first sub-groove 7 that extends from one first main groove 2 to the halfway region of the center land portion 4 (location of the tire equatorial plane TE) on the inward side in the tire width direction while angled to one side (bottom side in FIG. 1) with regards to the tire circumferential direction TC, and a second sub-groove 8 that extends from the second first main groove 2 to the halfway region of the center land portion 4 (location of the tire equatorial plane TE) to the inward side in the tire width direction while angled to one side (top side in FIG. 1) with regards to the tire circumferential direction TC, are formed in the center land portion 4. The first sub-groove 7 and the second sub-groove 8, which extend in the same angle direction with regards to the tire circumferential direction TC, are alternatingly arranged at prescribed intervals in the tire circumferential direction, and the center land portion 4 is formed as a rib. The rigidity in the tire circumferential direction of the center land portion 4 is increased by alternatingly forming the first sub-grooves 7 and the second sub-grooves 8 that extend to the halfway region of the center land portion 4.

A first sipe 9 that extends in the tire width direction from the inner edge of the first sub-grooves 7 to the second first main groove 2, and a second sipe 10 that extends in the tire width direction from the inner edge of the second sub-grooves 8 to one first main groove 2, are formed in the center land portion 4. The sipes 9, 10 extend in the tire width direction while being angled similarly to the sub-grooves 7, 8. By connecting the sipes 9, 10 to the sub-grooves 7, 8 in this manner, the sub-grooves 7, 8 can easily move when in contact with the ground, and snow that becomes lodged in the sub-grooves 7, 8 will easily be discharged.

Note, the sipes referred to herein are cuts with a width between 0.5 and 1.5 mm. Furthermore, the sub-grooves referred to herein include all grooves with widths that exceed 1.5 mm, but that are not included in the aforementioned main grooves. The same applies to the sipes and sub-grooves referred to hereinafter.

Figure 2:
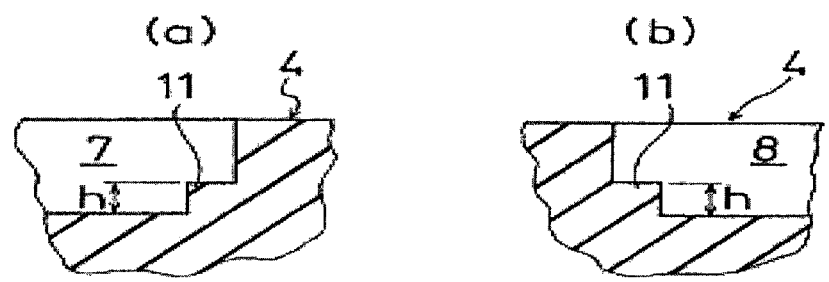
FIGS. 2(a) and (b) are enlarged cross-section views of a bottom raised part formed in the groove bottom of the sub-grooves in each of the center land portions.

As shown in FIG. 2, bottom raised parts 11 that rise up from the groove bottom are formed in the groove bottoms of the inside edge part of the first sub-grooves 7 and the inside edge part of the second sub-grooves 8. The portion of the land portions that encompasses the sub-grooves 8, 9 is connected by the bottom raised part 11, and the rigidity to the center side in the tire width direction of the center land portion 4 is increased by this bottom raised part 11.

A third sub-groove 12 that extends in the tire width direction from the first main groove 2 to the second main groove 3, and a fourth sub-groove 13 that extends in the tire width direction from the second main groove 12 to the halfway region of the middle land portion 5 (center in the width direction) are formed in the middle land portion 5. The third sub-grooves 12 and the fourth sub-grooves 13 are in the same angle direction with regards to the tire circumferential direction TC, and the first sub-grooves 7 and the second sub-grooves 8 are angled in the opposite direction.

The third sub-grooves 12 are located at predetermined intervals in the tire circumferential direction TC, and the middle land portions 5 are demarcated into blocks 14 by the first main groove 2, second main groove 3, and the third sub-grooves 12. One fourth sub-groove 13 is formed in each block 14. A third sipe 15 that extends in the tire width direction from the inside edge of each of the fourth sub-grooves 13 to the first main groove 2 and one fourth sipe 16 that linearly transects each of the blocks 14 in the tire circumferential direction TC at essentially the center in the width direction are formed in the middle land portion 5. The third sipe 15 extends in the tire width direction while being angled similarly to the fourth sub-groove 13, and the fourth sipe 16 extends along the tire circumferential direction TC so as to pass through the inside edge of the fourth sub-groove 13. In this manner, by connecting the third sipe 15 to the fourth sub-groove 13, the fourth sub-groove 13 will easily move when in contact with the ground, and snow that becomes lodged in the fourth sub-groove 13 will easily be discharged. Furthermore, the edge component in the tire circumferential direction is secured by the fourth sipe 16.

The third sub-grooves 12 include an inside sub-groove 12A that extends from the first main groove 2 to the halfway region of the middle land portion 5 (approximately the center in the width direction) and an outside sub-groove 12B that extends from the middle region to the second main groove 3. The width of the outside sub-groove 12B is narrower than the width of the inside sub-groove 12A. The width of the inside sub-groove 12A is essentially the same as the width of the fourth sub-groove 13. By changing the width of the third sub-groove 12 in this manner, the third sub-groove 12 can easily move when in contact with the ground, and snow that becomes lodged in the third sub-groove 12 can easily be discharged.

Figure 3:
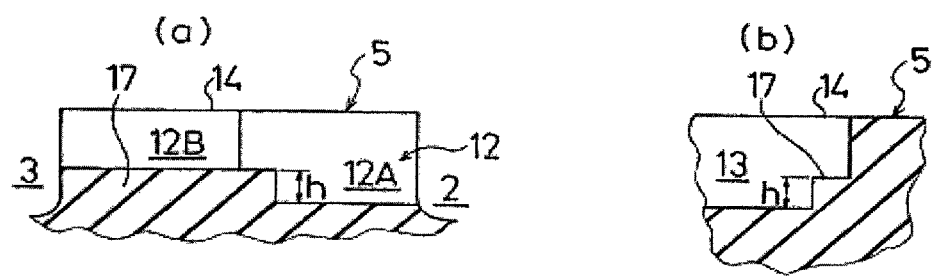
FIGS. 3(a) and (b) are enlarged cross-section views of the raised bottom part formed in the groove bottom of the sub-grooves in each of the middle land portions.

As shown in FIG. 3, a raised bottom part 17 that rises from the groove bottom is also provided in the groove bottom of the inside edge part of the fourth sub-groove 13 and the middle part (the center region in the tire width direction) of the third sub-groove 12. The bottom raised part 17 provided in the third sub-groove 12 straddles from the inside sub-groove 12A to the outside sub-groove 12B, and also extends along the entire region of the groove bottom of the outside sub-groove 12B. The land portions on either side of the sub-grooves 12, 13 are connected by the bottom raised part 17, and therefore the rigidity toward the center side in the tire width direction of the middle land portion 5 is increased by this bottom raised part 17.

A fifth sub-groove 18 that extends from the second main groove 3 past the tire ground contact edge CE toward the outside in the tire width direction, and a sixth sub-groove 19 that extends from the halfway region of the shoulder land portion 6 past the tire ground contact edge CE toward the outside in the tire width direction are formed in the shoulder land portion 6. The fifth sub-grooves 18 are located at predetermined intervals in the tire circumferential direction TC, and the shoulder land portion 6 is demarcated into blocks 20 by the second main groove 3 and the fifth sub-groove 18. A sixth sub-groove 19 is formed in each block 20. A fifth sipe 21 extends in the tire width direction from the second main groove 3 to each of the sixth sub-grooves 19.

Figure 4:
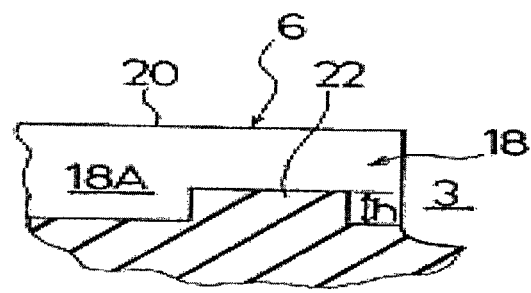
FIG. 4 is an enlarged cross-section view of the bottom raised part formed in the groove bottom of the sub-grooves in the shoulder land portions.

As shown in FIG. 4, a bottom raised part 22 that rises from the groove bottom is also formed in the groove bottom of each of the fifth sub-grooves 18. The bottom raised part 22 is formed in a portion of the groove bottom of the fifth sub-groove part 18A that is located to the inside in the tire width direction of the tire ground contact edge CE. The land portions (block 20) on either side of the fifth sub-groove 18 are connected by the bottom raised part 22, and the rigidity of the shoulder land portion 6 is enhanced by this bottom raised part 22.

A total groove surface area ratio of the sub-grooves and the sipes (total groove surface area of sub-grooves and sipes/area of the land portion without sub-grooves and sipes) in the land portions 4, 5, 6 is different in the center land portion 4 and the shoulder land portion 6 as compared to the middle land portion 5. The total groove surface area ratio is lower in the center land portion 4 and the shoulder land portion 6, and the total groove surface area ratio is higher in the middle land portion 5.

Figure 5:
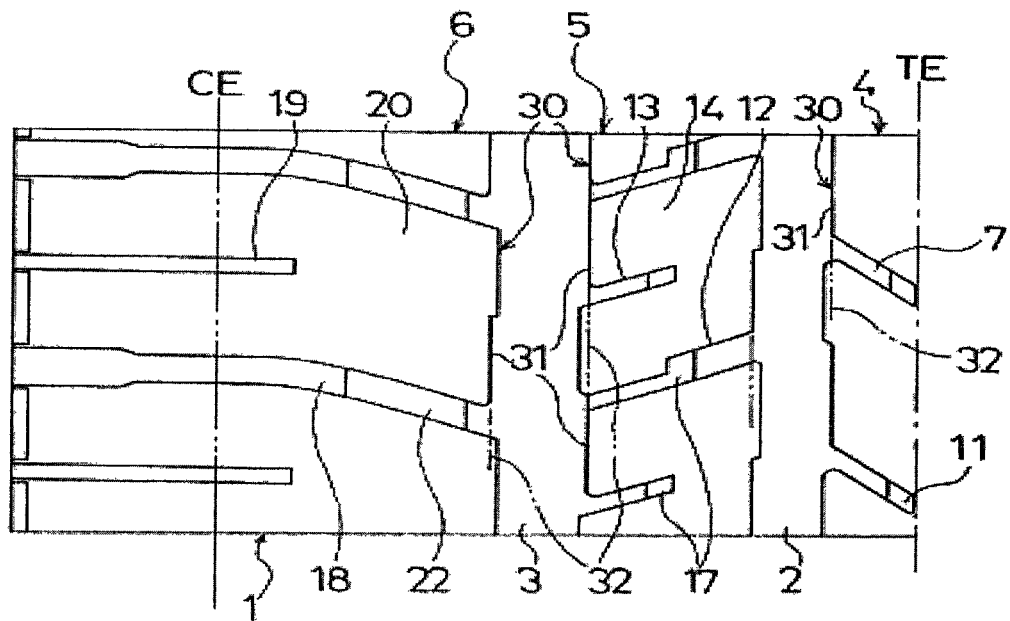
FIG. 5 is an explanatory diagram showing the method of measuring the surface area of a sub-groove.

Note, as shown in FIG. 1, if the side surfaces that form the main grooves of the land portions 4, 5, and 6 have recesses and protrusions, and sub-grooves are formed at the borders of these recesses and protrusions, as shown in FIG. 5 (sipes are omitted), the surface area of the sub-grooves is the surface area on the tread surface 1 of the sub-grooves demarcated by a straight line 32 identified by the double dotted line that extends a recessed side surface part 31 of side surfaces 30 of the land portions 4, 5, 6. Furthermore, the surface area of the sub-grooves 18, 19 in the shoulder land portion 6 is the surface area in the region toward the inside of the tire ground contact edge CE in the tire width direction. The sipes in the shoulder land portion 6 are treated similarly to the sub-grooves 18, 19.

With the aforementioned present invention, on dry surfaces, the groove surface area ratio is low in the center land portion 4 that affects steering stability when driving straight and in the shoulder land portion 6 that affects steering stability when cornering. Therefore the land portion rigidity can be increased and the steering stability improved on dry road surfaces so dry performance can be enhanced. At the same time, the groove surface area ratio is increased in the middle land portion 5 that affects snow performance, so the loss of snow performance can be suppressed even though the groove surface area ratio is lower in the center land portion 4 and the shoulder land portion 6. Therefore, snow performance can be maintained at a level equivalent to conventional levels.

Furthermore, the rigidity of the land portions 4, 5, 6 can be increased by forming bottom raised parts 11, 17, 22, so the steering stability can be further enhanced on dry road surfaces and dry performance can be further improved.

With the present invention, the surface area ratio of the sub-grooves and the surface area ratio of the sipes in the land portions 4, 5, 6 are both preferably lower in the center land portion 4 and the shoulder land portion 6, and higher in the middle land portion 5. In this case, if the surface area ratio of the sub-grooves 7, 8 in the center land portion 4 is A, the surface area ratio of the sub-grooves 12, 13 in the middle land portion 5 is B, and the surface area ratio of the sub-grooves 18, 19 in the shoulder land portion 6 is C, the relationships $2.0A \geq B \geq 1.1A$ and $2.0C \geq B \geq 1.1C$ should be satisfied. Furthermore, if the surface area ratio of the sipes 9, 10 in the center land portion 4 is A', the surface area ratio of sipes 15, 16 in the middle land portion 5 is B', and the surface area ratio of sipes 21 in the shoulder land portion 6 is C', the relationships $2.0A' \geq B' \geq 1.1A'$ and $2.0C' \geq B' \geq 1.1C'$ are preferably satisfied.

If the surface area ratio B of the sub-grooves 12, 13 in the middle land portion 5 is smaller than 1.1A, the surface area ratio B of the sub-grooves 12, 13 in the middle land portion 5 will be insufficient. Therefore, snow performance will be degraded when high rigidity is ensured by reducing the surface area ratio A of the sub-grooves 7, 8 in the center land portion 4. On the other hand, if the surface area ratio B of the sub-grooves 12, 13 in the middle land portion 5 is increased to ensure snow performance, the surface area ratio A of the sub-grooves 7, 8 in the center land portion 4 will be increased, so improving dry performance will be difficult. If the surface area ratio B of the sub-grooves 12, 13 of the middle land portion 5 is larger than 2.0A, the rigidity difference between the center land portion 4 and the middle land portion 5 will be too large, so uneven wearing will easily occur. The same applies if the surface area ratio B of the sub-grooves 12, 13 in the middle land portion 5 is outside of the aforementioned range with regards to the surface area ratio C of the sub-grooves 18, 19 of the shoulder land portion 6.

If the surface area ratio B' of the sipes 15, 16 in the middle land portion 5 is smaller than 1.1A', when the surface area ratio A' of the sipes 9, 10 in the center land portion 4 is reduced in order to enhance the higher rigidity, the surface area ratio B' of the sipes 15, 16 in the middle land portion 5 will be insufficient. Therefore, snow performance will be degraded. On the other hand, if the surface area ratio B' of the sipes 15, 16 in the middle land portion 5 is increased in order to ensure snow performance, the surface area ratio A' of the sipes 9, 10 in the center land portion 4 will increase, so improving dry performance will be difficult. If the surface area ratio B' of the sipes 15, 16 in the middle land portion 5 is larger than 2.0A', the rigidity difference between the center land portion 4 and the middle land portion 5 will be too large, so uneven wear can easily occur. The same applies if the surface area ratio B' of the sipes 15, 16 in the middle land portion 5 is outside of the aforementioned range with regards to the surface area ratio C' of the sipe 21 in the shoulder land portion 6.

With regards to a tire ground contact width D, the position on the first main groove 2 should be in a range between 0.05D and 0.2D toward the outside from the tire equatorial plane TE in the tire width direction. Furthermore, the position of the second main groove 3 is preferably in a range between 0.2D and 0.4D toward the outside from the tire equatorial plane TE in the tire width direction.

If the first main groove 2 is located to the inside of the location of 0.05 D in the tire width direction, the width of the center land portion 4 will be too narrow and the lateral rigidity will be low, and therefore improving dry performance will not be possible. If the first main groove 2 is located to the outside in the tire width direction of the location of 0.2 D, the middle land portion 5 will be partially shifted to the outside of the position that has a great effect on snow performance, which is undesirable. If the second main groove 3 is located to the outside in the tire width direction of the location of 0.4 D, the width of the shoulder land portion 6 will be too narrow and the lateral rigidity will be low, and therefore improving dry performance will be difficult. If the second main groove 3 is located to the inside in the tire width direction of the location of 0.2 D, the middle land portion 5 will be partially shifted toward the inside of the position that has a large effect on snow performance, which is undesirable.

A height h of the bottom raised parts 11, 17, 22 from the groove bottom is preferably in a range between 25 and 75% of the depth of the sub-groove where the bottom raised part is formed. If the height of the bottom raised part is less than 25% of the depth of the sub-groove, the reinforcing effect of the bottom raised part can not be achieved. Conversely, if the height of the bottom raised part is greater than 75% of the depth of the sub-groove, snow performance will be severely degraded.

Figure 6:
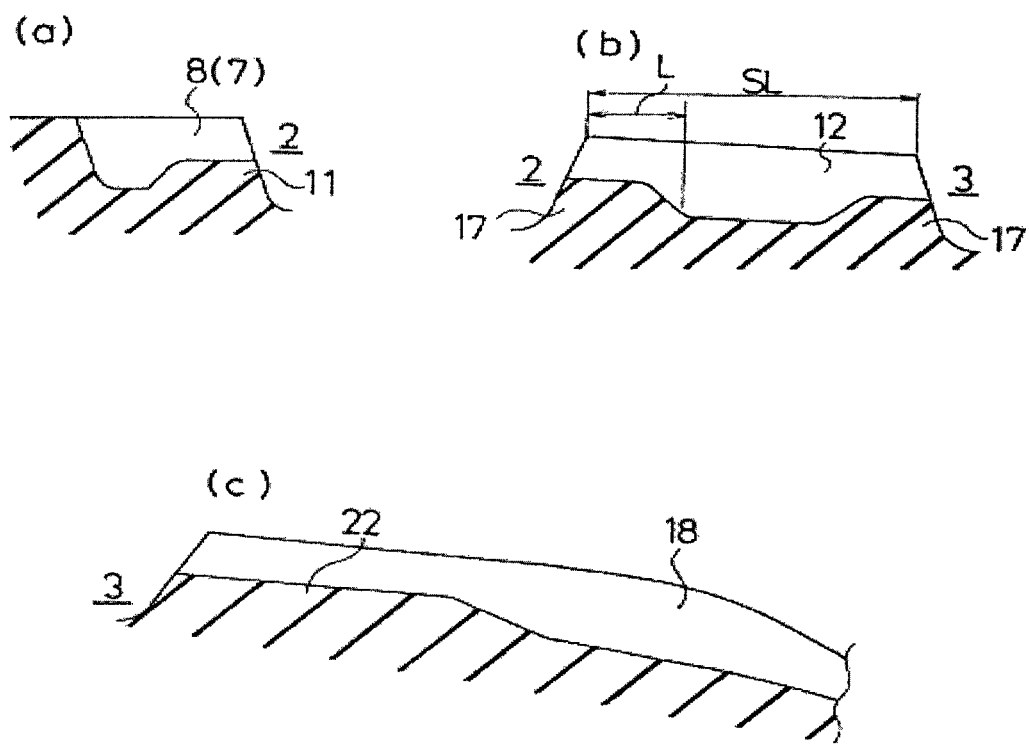
FIGS. 6(a), (b), and (c) are enlarged cross-section views showing other examples of bottom raised parts formed in the sub-grooves.

From the perspective of high-frequency road noise (cabin noise), the aforementioned bottom raised parts 11, 17, 22 are preferably as shown in FIG. 6. In other words, the bottom raised part 11 formed in the sub-grooves 7, 8 is formed to extend partially to the first main groove 2 as shown in FIG. 6(a). Furthermore, the bottom raised part 17 in the third sub-groove 12 is preferably formed to have both a bottom raised part 17 that partially extends to the first main groove 2 and a bottom raised part 17 that partially extends to the second main groove 3, as shown in FIG. 6(b). The bottom raised part 17 in the fourth sub-groove 13 preferably has a part that partially extends to the second main groove 3. Furthermore, the bottom raised part 22 in the fifth sub-groove 18 preferably has a part that extends to the second main groove 3 as shown in FIG. 6(c). Thereby, in addition to increasing the steering stability on dry road surfaces, the rigidity in the corner region of the land portion that forms the surface of the main grooves 2, 3 can be increased, and therefore slipping of the land portion is suppressed, which contributes to suppressing cabin noise.

If the bottom raised parts 11, 17, 22 are formed to extend to the main grooves 2, 3, a length L of the bottom raised parts 11, 17, 22 in the tire lateral direction is preferably between 20 and 40% of a length SL in the tire width direction of the sub-groove where the bottom raised parts 11, 17, 22 are formed. If the length L is less than 20%, effectively improving cabin noise will be difficult. On the other hand, if the length L exceeds 40%, there will be a negative effect on snow performance.

Figure 7:
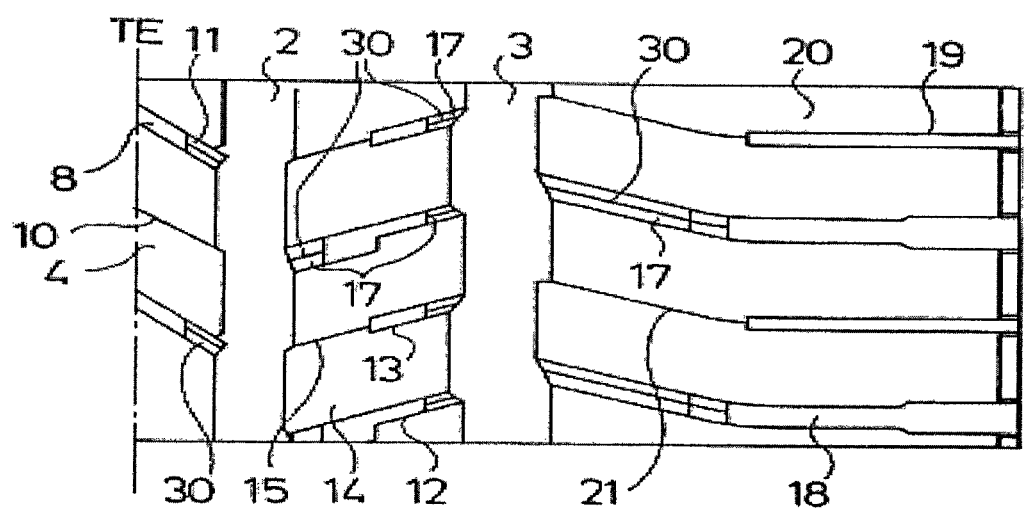
FIG. 7 is a partial enlarged view of the tread surface with sipes formed in the bottom raised part.

Furthermore, as shown in FIG. 7, one sipe 30 is preferably formed in the bottom raised parts 11, 17, 22 along the sub-grooves 7, 8, 12, 13, 18 where the bottom raised parts 11, 17, 22 are formed. Thereby the sub-groove will more readily move when in contact with the ground, and snow that has become lodged in the sub-groove can be more easily discharged. Furthermore, this can provide an effect of partially compensating for the sub-groove part where the sipe 30 is lost when the bottom raised part is exposed to the surface when worn down.

The depth of the sipe 30 can essentially be the same depth as the groove bottom of the main grooves 2, 3. The sipe 30 preferably extends from one end of the bottom raised part 11, 17, 22 to the other end, from the perspective of the aforementioned effect.

Note, the surface area ratio of the sub-grooves and sipes referred to in the present invention are measured by attaching a tire to a standard rim in accordance with JATMA (The Japan Automobile Tyre Manufacturers Association Inc.) (JATMA YEAR BOOK 2007), and filling to an air pressure of 180 kPa (without loading). Furthermore, the tire ground contact edge CE is the ground contact edge measured by attaching the tire to a standard rim according to JATMA, filling to an air pressure of 180 kPa, and applying a load corresponding to 70% of the maximum load capability in accordance with JATMA.

The present invention is preferably used as a pneumatic tire for passenger vehicles in particular. The total groove surface area ratio including the main grooves, sub-grooves, and sipes in the tread surface 1 can be in a range between 30 and 45%.

Embodiment 1

Figure 8:
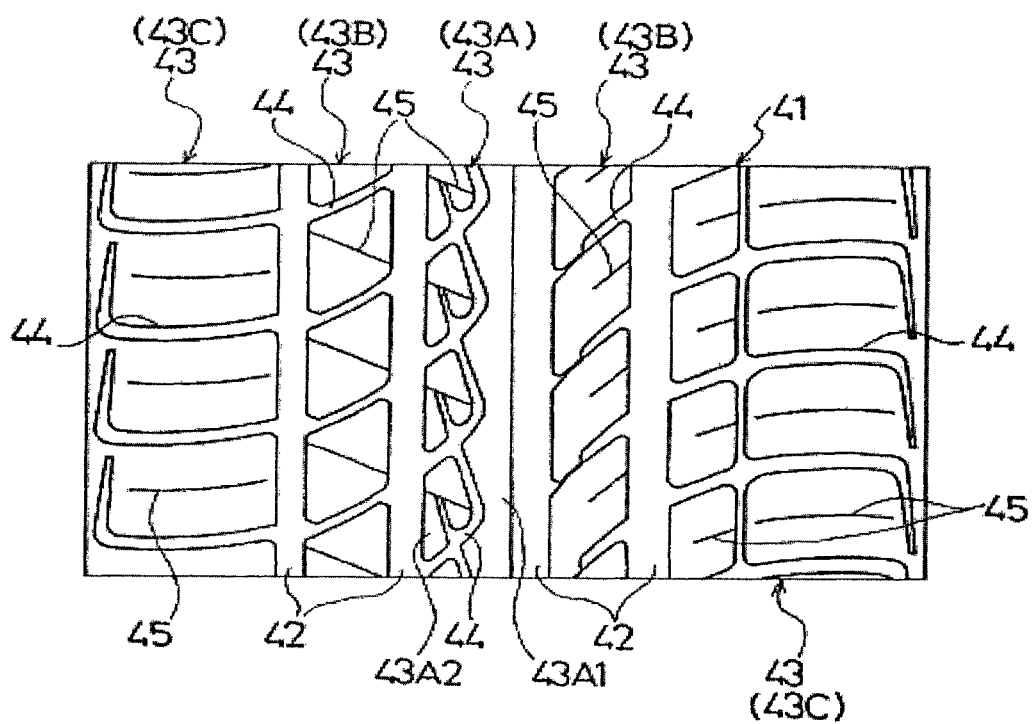
FIG. 8 is a partial development view of the tread surface showing an example of a conventional pneumatic tire.

Maintaining a common tire size of 215/50R17, tires 1 through 3 of the present invention (embodiments 1 through 3) and comparative tires 1 and 2 (comparative examples 1 and 2), which all had a configuration as shown in FIG. 1 without a bottom raised part and where the surface area ratio of the sub-grooves and sipes of the center land portion, middle land portion, and shoulder land portion, were fabricated as shown in Table 1 as test tires. Additionally, a tire 4 of the present invention (embodiment 4) which was the tire 2 of the present invention with a bottom raised part as shown in FIGS. 2 through 4, and a conventional tire (conventional example) which had the tread pattern shown in FIG. 8 were also fabricated as test tires.

With the tires of the present invention and the comparative tires, the two first main grooves were located in a position between 0.05D and 0.07D in both outside directions in the tire width direction from the tire equatorial plane, and the two second main grooves were located at a position between 0.23D and 0.25D in both the outside directions in the tire width direction from the tire equatorial plane. The total groove surface area ratio including the main grooves, sub-grooves, and sipes of the test tires were all 36%. The height of the bottom raised part of the tire 4 of the present invention was 70% of the depth of the sub-groove.

Each of these test tires was mounted on a wheel with a rim size of 17×7 JJ, filled to a tire pressure of 230 kPa, attached to a passenger vehicle with a displacement of 2,400 cc, and subjected to evaluation tests for dry performance and snow performance using the test methods shown below. The results are shown in Table 1.

Dry Performance

A sensory test of the steering stability was performed using a test driver on a dry road test course. The evaluation results are expressed as an index value with a conventional tire being 100. A larger index value indicates that dry performance was superior.

Snow Performance

A sensory test of the steering stability was performed using a test driver on a snowy road test course. The evaluation results are expressed as an index value with a conventional tire being 100. A larger index value indicates that snow performance was superior. An index value between 98 and 102 was considered to be at the same level as the conventional tire.

TABLE 1

| | | Embodiment 1 | Embodiment 2 | Embodiment 3 | Embodiment 4 | Comparative example 1 | Comparative example 2 | Conventional example |
|---|---|---|---|---|---|---|---|---|
| Center land portion | Sub-groove surface area ratio (%) | 13 | 11 | 9 | 11 | 14 | 16 | — |
| | Sipe surface area ratio (%) | 3 | 3 | 2 | 3 | 3 | 4 | — |
| Middle land portion | Sub-groove surface area ratio (%) | 16 | 16 | 19 | 16 | 14 | 11 | — |
| | Sipe surface area ratio (%) | 4 | 4 | 5 | 4 | 3 | 2 | — |

TABLE 1-continued

|  |  | Embodiment 1 | Embodiment 2 | Embodiment 3 | Embodiment 4 | Comparative example 1 | Comparative example 2 | Conventional example |
|---|---|---|---|---|---|---|---|---|
| Shoulder land part | Sub-groove surface area ratio (%) | 14 | 14 | 12 | 14 | 14 | 16 | — |
|  | Sipe surface area ratio (%) | 2 | 2 | 2 | 2 | 3 | 4 | — |
| Bottom raised part |  | None | None | None | Present | None | None | None |
| Dry performance |  | 103 | 105 | 107 | 110 | 105 | 95 | 100 |
| Snow performance |  | 99 | 98 | 98 | 98 | 95 | 95 | 100 |

From Table 1, it can be seen that the present invention can improve dry performance while maintaining snow performance equivalent to conventional levels. Furthermore, from the tire 4 of the present invention, it can be seen that dry performance can be further improved by providing a bottom raised part.

Embodiment 2

Using the same tire size as embodiment 1, a tire 5 of the present invention (embodiment 5) with bottom raised parts (where the length L was 30% of the length SL of the sub-groove) in the groove bottom of the first through fifth sub-grooves extending to the main grooves as shown in FIG. 6 was fabricated as a test tire using the tire 1 of the present invention. Additionally, a tire 6 of the present invention (embodiment 6) with a sipe in each of the bottom raised parts as shown in FIG. 7 was fabricated as a test tire using the tire 5 of the present invention.

Each of these test tires was mounted on a passenger vehicle with a displacement of 2,400 cc similar to embodiment 1, and then evaluation tests of dry performance and snow performance were performed by the test methods shown in these embodiments. In addition, an evaluation test of the high-frequency road noise (cabin noise) was performed using the test method shown below. The results are shown in Table 2. Additionally, an evaluation test for the high-frequency road noise (cabin noise) was performed in a manner similar to tire 1 of the present invention.

High-frequency Road Noise

A sensory evaluation of cabin noise while driving straight at a speed of 100 km/h on a test course was performed using a test driver. The evaluation results are expressed as an index value with the tire 1 of the present invention being 100. Larger index values indicate less cabin noise.

TABLE 2

|  | Embodiment 5 | Embodiment 6 |
|---|---|---|
| Bottom raised part sipes | None | Present |
| Dry performance | 111 | 108 |
| Snow performance | 98 | 99 |
| High-frequency road noise | 108 | 107 |

From Table 2, it can be seen that the tires 5, 6 of the present invention can improve dry performance while maintaining snow performance at equivalent to conventional levels, and can also reduce cabin noise.

What is claimed is:

1. A pneumatic tire comprising:
    one first main groove that extends in a circumferential direction of the tire on each side of a tire equatorial plane on a tread surface,
    one second main groove that extends in the tire circumferential direction formed on the outward side of each first main groove, and
    five land portions that are formed by the four main grooves, wherein these five land portions are formed from:
    a center land portion positioned between the first main grooves,
    two middle land portions located between the first main grooves and the second main grooves, and
    two shoulder land portions located to the outside in the tire width direction from the second main grooves,
    each of the land portions having sub-grooves and sipes formed therein, wherein
    a combined groove surface area ratio of the sub-grooves and the sipes in each of the land portions is different in the center land portion and the shoulder land portions, as compared to the middle land portions; the groove surface area ratio of the center land portion and the shoulder land portions being lower, and the groove surface area ratio of the middle land portions being higher,
    the sub-grooves of the middle land portions comprise:
        third sub-grooves that extend from the first main groove to the second main groove in the tire width direction, wherein the third sub-grooves are located at a prescribed interval in the tire circumferential direction,
        fourth sub-grooves that extend from the second main groove to a halfway region of the middle land portion in the tire width direction,
    the middle land portion is formed into blocks demarcated by the first main groove, the second main groove, and the third sub-grooves, and
    one of the fourth sub-grooves is formed in each block, and sipes in the middle land portion include third sipes that extend from the inner edge of the fourth sub grooves to the first main groove in the tire width direction and a fourth sipe that transects each block in the tire circumferential direction.

2. The pneumatic tire according to claim 1, wherein the sub-groove surface area ratio and the sipe surface ratio are both lower in the center land portions and the shoulder land portions, and higher in the middle land portions.

3. The pneumatic tire according to claim 2, wherein if the surface area ratio of the sub-grooves in the center land portion is A, the surface area ratio of the sub-grooves in the middle land portion is B, and the surface area ratio of the sub-grooves in the shoulder land portion is C, $2.0A \geq B \geq 1.1A$ and $2.0C \geq B \geq 1.1C$; and if the surface area ratio of the sipes in the center land portion is A', the surface area ratio of the sipes in the middle land portions is B', and the surface area ratio of the sipes in the shoulder land portions is C', then $2.0A' \geq B' \geq 1.1A'$ and $2.0C' \geq B' \geq 1.1C'$.

4. The pneumatic tire according to claim 1, wherein the first main groove is located in a range between 0.05 D and 0.2 D from the tire equatorial plane toward the outside in the tire width direction with regards to the tire ground contact width D, while the second main grooves are located in a range between 0.2 D and 0.4 D from the tire equatorial plane towards the outside in the tire width direction.

5. The pneumatic tire according to claim 1, wherein:
the first sub-grooves in the center land portion consist of first sub-grooves that extend from a first main groove to a halfway region of the center land portion and second sub-grooves that extend from a second first main groove to the halfway region of the center land portion which are arranged alternatingly at a prescribed interval in the tire circumferential direction,
the center land portion forms a rib, and
sipes on the center land portion include first sipes that extend from the inner edge of the first sub-grooves to the second first main groove and second sipes extend from the inner edge of the second sub-grooves to one first main groove.

6. The pneumatic tire according to claim 5, wherein a bottom raised part is formed in the groove bottom of the inner edge part of the first sub-grooves and the second sub-grooves.

7. The pneumatic tire according to claim 5, wherein the bottom raised part is partially formed in the groove bottom of the first sub-grooves and the second sub-grooves.

8. The pneumatic tire according to claim 7, wherein a length in the tire width direction of the bottom raised part is between 20 and 40% of a length in the tire width direction of the sub-groove where the bottom raised part is formed.

9. The pneumatic tire according to claim 8, wherein sipes that extend along the sub-grooves are formed in the bottom raised part.

10. The pneumatic tire according to claim 7, wherein sipes that extend along the sub-grooves are formed in the bottom raised part.

11. The pneumatic tire according to claim 1, wherein the bottom raised part is formed in the groove bottom on the inner edge part of the fourth sub-grooves and in the middle part of the third sub-grooves.

12. The pneumatic tire according to claim 11, wherein
the third sub-grooves consist of inner side sub-grooves that extend from the first main groove to the halfway region of the middle land portion and outer side sub-grooves that extend from the halfway region to the second main groove; and
the width of the outer side sub-groove is narrower than the width of the inner side sub-groove.

13. The pneumatic tire according to claim 1, wherein the bottom raised part that extends to the first main groove in the groove bottom of the third sub-groove and the bottom raised part that extends to the second main groove are formed in some regions.

14. The pneumatic tire according to claim 13, wherein the bottom raised part is formed in some regions of the groove bottom part of the fifth sub-groove that is located to the inside in the tire width direction of the tire ground contact edge.

15. The pneumatic tire according to claim 14, wherein the bottom raised part extends to the second main groove.

16. The pneumatic tire according to claim 13, wherein a length in the tire width direction of the bottom raised part is between 20 and 40% of a length in the tire width direction of the sub-groove where the bottom raised part is formed.

17. The pneumatic tire according to claim 1, wherein
the third sub-grooves consist of inner side sub-grooves that extend from the first main groove to the halfway region of the middle land portion and outer side sub-grooves that extend from the halfway region to the second main groove, and
the width of the outer side sub-groove is narrower than the width of the inner side sub-groove.

18. The pneumatic tire according to 17, wherein the sub-grooves in the shoulder land portion comprise:
fifth sub-grooves that extend in the tire width direction from the second main groove past the tire ground contact edge; and
sixth sub-grooves that extend in the tire width direction from the halfway region of the shoulder land portion past the tire ground contact edge, wherein
the fifth sub-grooves are located at prescribed intervals in the tire circumferential direction,
the shoulder land portion is demarcated into blocks by the second main groove and the fifth sub-grooves,
a single sixth sub-groove is formed in each block, and
sipes are formed in a tire width direction from the second main groove to the sixth sub-groove.

19. The pneumatic tire according to claim 1, wherein:
the sub-grooves in the center land portion consist of first sub-grooves that extend from a first main groove to a halfway region of the center land portion and second sub-grooves that extend from a second first main groove to the halfway region of the center land portion which are arranged alternatingly at a prescribed interval in the tire circumferential direction,
the sub-grooves of the middle land portions comprise third sub-grooves that extend from the first main groove to the second main groove in the tire width direction, and
the third sub-grooves and the fourth sub-grooves are in a same angle direction with regards to the tire circumferential direction, and the first sub-grooves and the second sub-grooves are angled in the opposite direction against the third sub-grooves and the fourth sub-grooves.

20. The pneumatic tire according to claim 19, wherein:
the third sub-grooves include an inside sub-groove that extends from the first main groove to the halfway region of the middle land portion and an outside sub-groove that extends from the halfway region of the middle land portion to the second main groove, and
the width of the outside sub-groove is narrower than the width of the inside sub-groove.

21. The pneumatic tire according to claim 1, wherein the sub-grooves in the shoulder land portion comprise
fifth sub-grooves that extend in the tire width direction from the second main groove past the tire ground contact edge and
sixth sub-grooves that extend in the tire width direction from the halfway region of the shoulder land portion past the tire ground contact edge, wherein
the fifth sub-grooves are located at prescribed intervals in the tire circumferential direction,
the shoulder land portion is demarcated into blocks by the second main groove and the fifth sub-grooves,
a single sixth sub-groove is formed in each block, and
sipes are formed in a tire width direction from the second main groove to the sixth sub-groove.

* * * * *